Patented May 27, 1952

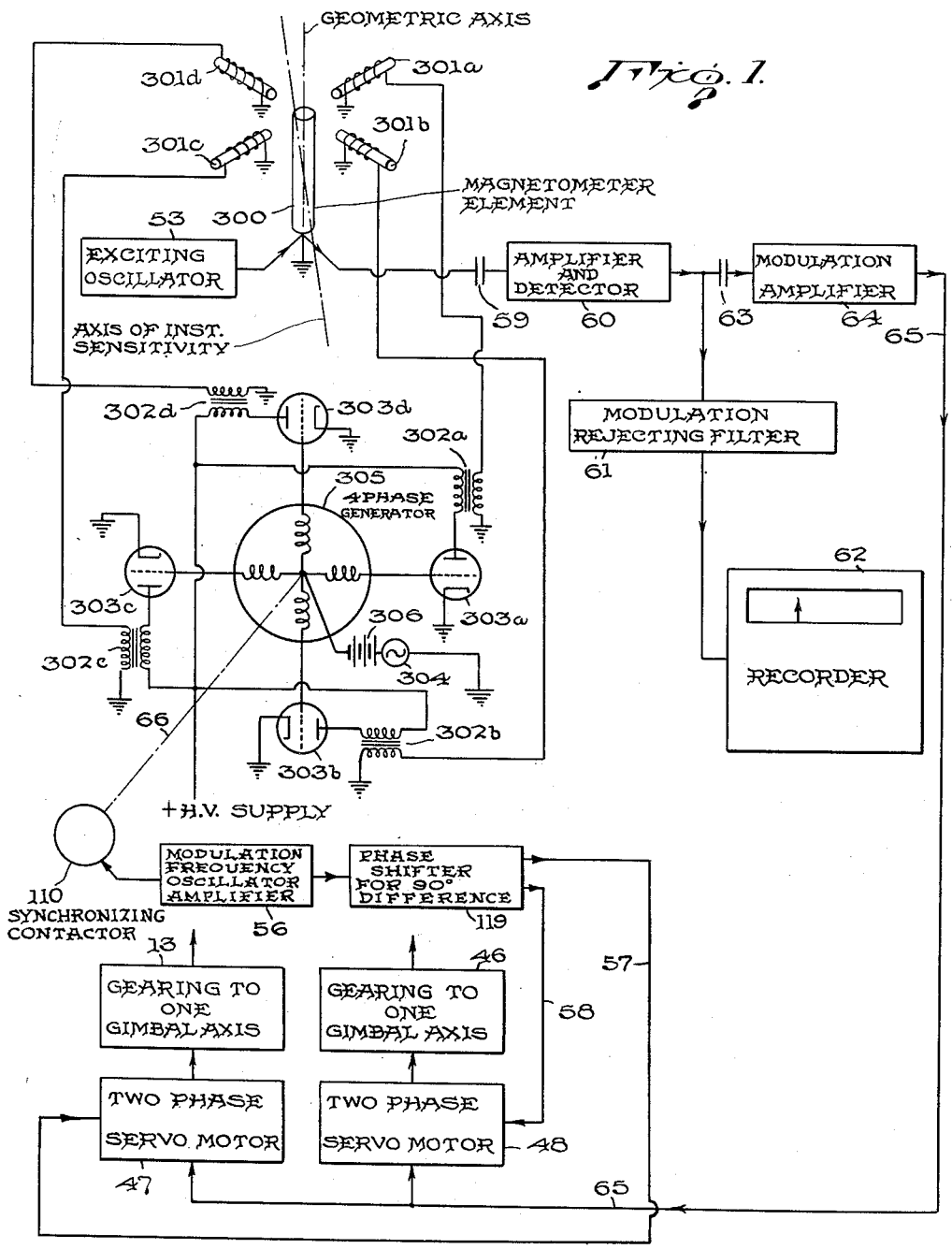

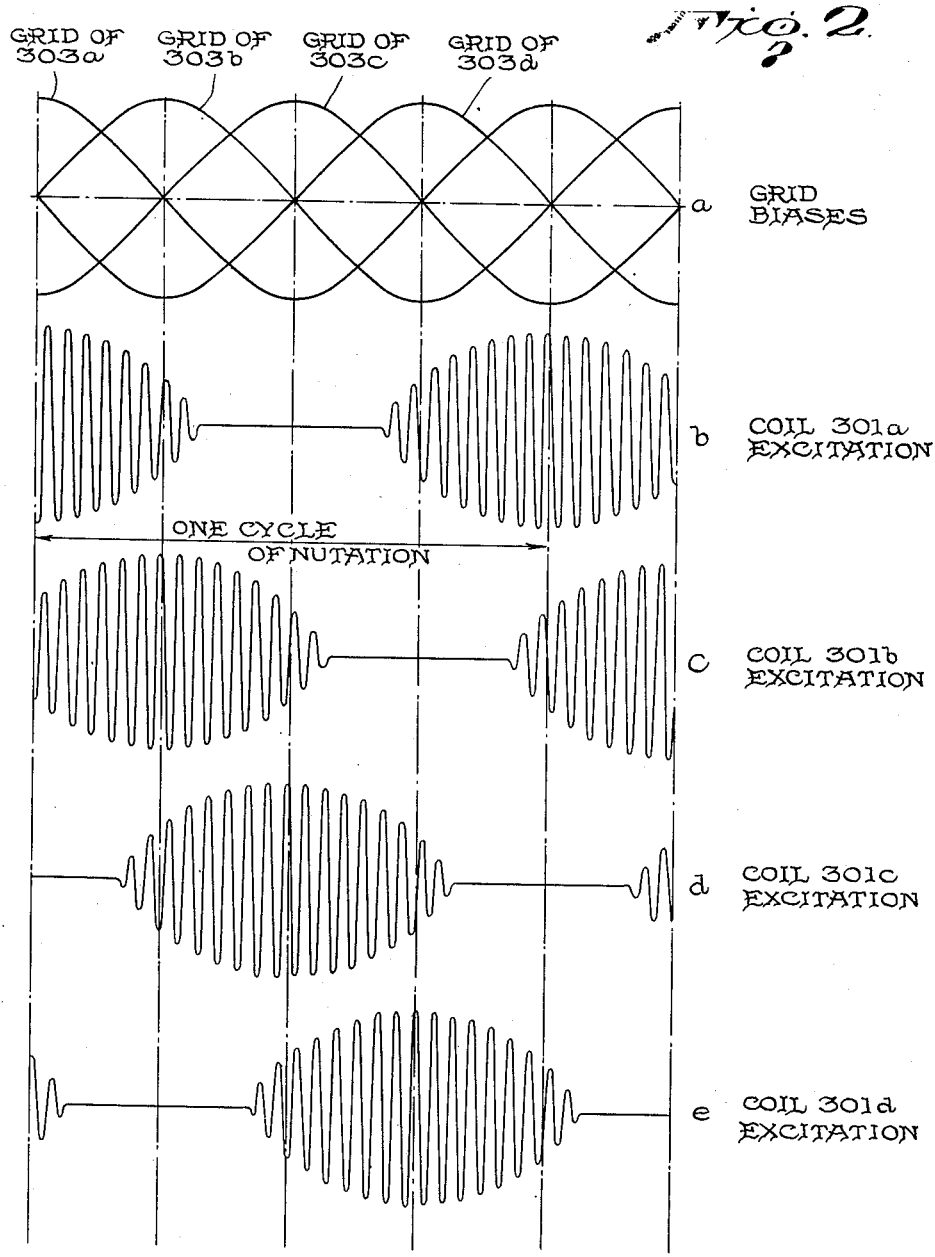

2,598,285

UNITED STATES PATENT OFFICE 2,598,285

METHOD AND APPARATUS FOR MEASURING INTENSITY OF MAGNETIC FIELDS

Gary Muffly, Penn Township, Allegheny County, Pa., assignor to Gulf Research & Development Company, Pittsburgh, Pa., a corporation of Delaware Original application June 23, 1947, Serial No. 756,426. Divided and this application May 3, 1951, Serial No. 224,304

6 Claims. (Cl. 177—380)

This invention concerns a magnetometer for measuring the total intensity of a magnetic field. In particular, it concerns an improved form of self-orienting total-intensity magnetometer suitable for use on a moving, tilting or gyrating vehicle for measuring the total intensity of a magnetic field.

This application is a division of my copending application Serial No. 756,426 entitled Apparatus for Measuring Intensity of Magnetic Field, filed June 23, 1947, now U. S. Patent No. 2,564,854, issued August 21, 1951 and assigned to the same assignee as the present invention.

Apparatus for measuring the intensity of a magnetic field for various purposes is well known. Many types of magnetometers suitable for special purposes are known in the prior art. The early magnetometers which were used particularly for measuring magnetic field intensity of the earth were required to be set up on a fixed support and it was necessary to orient their axes of sensitivity manually in the direction of the particular vector whose intensity was to be measured. In surveys of the earth's magnetic field the direction of the total vector was not known in advance and it was therefore customary to measure terrestrial components independently, from which the total vector could afterwards be computed.

In copending application Serial No. 508,550, filed November 1, 1943 by Vacquier and Muffly, now Patent No. 2,555,209, there is disclosed an apparatus which may be used for making magnetic surveys from a moving vehicle. One embodiment shown in application Serial No. 508,550 employs a detecting element of a type shown in Vacquier Patent No. 2,406,870 mounted in a universal support and having its direction of orientation in space stabilized by means of auxiliary magnetically-sensitive elements so that a desired component of the magnetic field may be measured as the magnetometer is moved about.

Another embodiment which is shown in application Serial No. 508,550 employs a Vacquier detecting element mounted in a universal support with means for simultaneously oscillating the magnetometer element about two mutually-perpendicular axes in such a way that the detecting element undergoes the magnetic field in various directions, these directions forming the elements of a cone whose axis is the average direction of the magnetometer element. The normal output signal of the detecting element is thereby modulated as a result of the directional displacements and the signal is analyzed into its quadrature components of modulation, which quadrature components are applied to two servomotors respectively so that the latter tend to orient the average axis of the magnetometer so as to reduce the modulation to a minimum. When the magnetometer is thus oriented, its signal output is a measure of the total magnetic vector and the device is a self-orienting total-vector magnetometer.

Copending application Serial No. 756,426, of which the present application is a division, discloses and claims a magnetometer in which the sensitive element itself is not nutated but its instantaneous axis of sensitivity is caused to nutate by rotating about one end of the sensitive element an axially-asymmetrical magnetic vane. The asymmetrical vane produces an angular displacement of the instantaneous axis of sensitivity with respect to the geometric axis of the element, and the rotation of the vane brings about a revolution of the instantaneous axis of sensitivity into various positions defined by a cone, thus effectively nutating the instantaneous axis of sensitivity about the geometric axis.

The present invention is another form of the above-mentioned apparatus of the application Serial No. 756,426, simplifying the construction thereof by the elimination of moving parts.

It is accordingly an object of this invention to provide a method and apparatus for measuring the total intensity of a magnetic field from a moving and tilting support.

Another object of this invention is to provide a method of sampling the magnetic field in various directions with a magnetically-responsive element and of utilizing the resulting signals for orienting the element substantially in the direction of the magnetic vector.

Another object of this invention is to provide a magnetometer which measures the total intensity of a magnetic field to a high degree of precision.

Another object of this invention is to provide an improved form of magnetometer which measures the total intensity of a magnetic field even though mounted on a moving and tilting support.

A further object of this invention is to provide a method by which a magnetometer signal is modulated in a manner from which any deviation of the direction of orientation of the magnetometer element from the direction of the magnetic field may be corrected.

A further object of this invention is to provide apparatus whereby a magnetometer signal may be modulated in a manner so that the modulation signal is a measure of the deviation of the magnetometer axis from the direction of the magnetic field.

A further object of this invention is to provide apparatus whereby the signal from a magnetometer is modulated in accordance with the magnetic-field intensity along directions adjacent that occupied by the magnetometer element and in which said modulation is used to orient the detector in the direction of maximum magnetic intensity.

A further object of this invention is to provide a method and apparatus of modulating the signal from a directionally-sensitive magnetometer in a manner which will depend on the directional orientation of the magnetometer in the magnetic field, said modulation being accomplished without moving the sensitive-detecting element itself.

These and other objects are attained in a manner which will be apparent from the following specification of which the accompanying drawings form a part, and in which Fig. 1 shows an embodiment of the invention, together with its schematic wiring diagram, in which displacement of the axis of sensitivity of the magnetometer is accomplished without moving the sensitive element of the magnetometer; and Fig. 2 shows excitation curves for the flux-deflecting vanes of Fig. 1.

The present invention concerns a magnetometer in which the instantaneous axis of sensitivity is made to nutate about the geometrical axis of the element but without the use of moving vanes. This invention is illustrated in Fig. 1. In the embodiment of Fig. 1 no moving vanes are employed, and instead of a rotating vane a number of fixed vanes 301-a, b, c and d are disposed in radial configuration about the detecting element 300 which may be of the type shown and claimed in Vacquier Patent 2,406,870. Four vanes with 90° spacing are shown in Fig. 1, although three vanes 120° apart or $n$ vanes $360°/n$ apart may be used if $n$ is an integer greater than two.

Vanes 301-a, 301-b, 301-c and 301-d are mounted near the end of a magnetically-sensitive element 300 and symmetrically placed with respect to the principal axis of element 300. Each vane is wound with insulated wire and may be excited through a transformer with A.-C. of a high frequency, preferably of frequency far above the normal excitation frequency of element 300. For example, if the element 300 is driven at 1,000 cycles/sec., then the vanes 301-a, 301-b, 301-c and 301-d may, for example, be excited at 30,000 cycles/sec. This high-frequency excitation should be strong enough to saturate the vane with A.-C. flux and thereby reduce its effective permeability to the direct flux of the earth's field.

Each vane 301-a, 301-b, 301-c and 301-d is in effect a magnetic deflector which allows some of the earth's flux from its own side of the detector element 300 to be detoured from its normal path. It takes some of the flux that would otherwise pass to one side of the core of element 300 and leads it over to the core. If the vanes were all identical and symmetrical, their total effect would be to increase the total flux through core of element 300 without disturbing the axis of sensitivity. If, however, any one vane conducts less than its share of flux, on the average, to the core of element 300, then the predominance of the flux from the opposite side of the element causes the axis of sensitivity to be inclined in the direction opposite to the vane. The detector 300 and its associated circuits are made to respond to the integrated-magnetic effect over periods of time long compared to the period of the high-frequency excitation of the vanes, but short compared to the period of the nutation frequency. The high-frequency excitation should be strong enough to saturate the vane with A.-C. flux so as to reduce its effective permeability during the time the high-frequency excitation is on. When any one of the vanes is so saturated, the effective axis of sensitivity of the magnetometer is displaced in the opposite direction by the opposite vane or vanes, which are unsaturated. If each vane is saturated in turn, the axis of sensitivity can be nutated continuously. This is accomplished with the circuit shown in Fig. 1 as will be explained later. When the high frequency is not present, the value of flux in the vane depends on the ambient field and orientation and may assume any value between the saturation values in the positive and negative senses. When the high-frequency excitation is present, however, the A.-C. excitation may be made strong enough to saturate the vane over most of the cycle. Thus, the vane is saturated in one direction during one-half of the high-frequency cycle and is saturated in the opposite direction during the other half of the high-frequency cycle. Since the saturation fluxes are equal and opposite, their time average is zero over the whole cycle, and thus, in effect, none of the ambient flux gets through. Of course, there will be a brief period when the flux is shifting from plus-to-minus saturation during which time the ambient field can have some effect, but this can be made as small as desired by increasing the high-frequency excitation. In practice, it is only necessary to increase the high-frequency excitation to the point where the ambient flux is sufficiently restricted to effect a displacement of the axis of sensitivity of element 300.

In Fig. 1 each vane, such as 301-a, receives its saturating A.-C. from high-frequency generator 304 by means of a commutating tube such as 303-a and transformer such as 302-a. The tubes are commutated, i. e. cut off and on, by means of a low-frequency multiphase generator 305, having the same number of phases as there are vanes 301. In the illustration, 4 phases are provided. A D.-C. cut off bias may be provided by battery 306, or alternatively tubes 302 may be of a type that cuts off at approximately zero bias. Transformers 302 serve to keep D.-C. out of the vane windings, as well as low-frequency transients which might otherwise disturb operation of the device. In operation, the high-frequency generator 304 excites the vane 301 and the low-frequency generator 305 controls the sequence of excitation by controlling the grid bias on tubes 303.

Fig. 2 shows at 2-a how the 4-phase alternator 305 shifts the individual grid biases of tubes 303 so that the tubes 303-a, b, c and d are rendered conducting in sequence. The superimposed high frequency from source 304 is not shown in Fig. 2-a, but as each grid reaches its maximum upward swing, the high-frequency output of the tube reaches its peak as shown in curves 2-b to 2-e. Each tube 303 is active for about half of the nutation period, the exact length being adjusted by proper choice of battery 306 and type of tubes 303 to make the nutation follow a smooth, approximately circular orbit. The use of three, four or more phases with symmetrical vanes is preferred. The response of detector element 300 should be fast enough to follow the frequency of generator 305 but too sluggish to follow the high frequency of generator 304. The detector circuit connected to and following element 300 is normally inherently sluggish toward the highest frequencies. This effect can be increased by placing shielding of non-magnetic conductive material (not shown) around vanes 301-a, b, c and d, or around element 300, or between the vanes and the element. Any such shielding should be only heavy enough to be effective against the high frequency, as it should have a minimum effect on the nutation frequency. If the above requirements are met, the magnetometer response integrates or averages the effect of vanes 301-a, b, c and d over several cycles of the high (saturating) frequency.

Fig. 1 shows the vanes 301 symmetrically disposed about one end of the element 300. This assembly may be mounted on a rigid, non-magnetic, electrically non-conducting framework (not shown) which in turn is suspended in gimbals (not shown) or other universal mounting in conventional manner. The orientation of the assembly 300—301 is controlled by servomotors (not shown) which are mechanically connected to rotate the assembly about the respective gimbal axes in well-known manner such as through the agency of belts or gears. These mechanical connections are schematically indicated in Fig. 1 by blocks 13 and 46, the servomotors themselves being schematically indicated by blocks 47 and 48. Servomotors 47 and 48 are of the two-phase type. The operation of the motor-control and other circuits of Fig. 1 will now be described.

The detecting element 300, which may be the type shown in Vacquier Patent 2,406,870, is excited by an oscillator 53 as described in said patent. Electrical connections leading to and from the element 300, the ground return as well as any other connection which may be necessary to operate servomotors 47 and 48, may conveniently be carried by flexible leads through hollow gimbals (not shown) or by means of brushes and slip rings (not shown) in well-known manner. As previously suggested, the frequency of exciting oscillator 53 should be intermediate between the nutating frequency and the vane-saturating high frequency. A frequency of 1000 C. P. S. has been found satisfactory for oscillator 53.

The output signal from the sensitive element 300 passes through condenser 59 to amplifier and demodulator 60. The demodulator in unit 60 is of conventional design and produces an output having a D.-C. component in proportion to the strength of the high-frequency output signal in the same manner as a detector in a radio receiver produces a D.-C. component usually employed for AVC. The demodulator 60 also produces an A.-C. component which is proportional to the amplitude of modulation, also in a manner similar to that of a radio-receiver detector. The D.-C. component of the demodulated signal output is transferred through low-pass filter 61 to recorder 62 which will be described later. Low-pass filter 61 is for the purpose of rejecting the modulation signal and keeping it out of the recorder. Circuit 61 is conventional and may comprise two resistors and a condenser as is well known. The A.-C. modulation signal output from the amplifier-demodulator 60 passes through the condenser 63 to the modulation amplifier 64 whose output is carried by connection 65 to both orienting servomotors 47 and 48.

A phasing signal may be obtained which is related to the rotation of generator 305. This signal must bear a fixed phase relationship to the output of generator 305. This phasing signal is conveniently obtained by means of a synchronizing contactor 110 mechanically connected to the shaft of generator 305 as indicated in Figure 1 by connection 66. A small contact brush (not shown) makes contact with the synchronizing contactor 110 upon each revolution of the generator 305. In this way the contactor 110 gives an indication of the phase position of the progressive excitation of vanes 301. The impulse from contactor 110 serves to synchronize an oscillator and associated amplifier indicated by 56. Contactor 110 closes a circuit each time the excitation of elements 301 makes one revolution and the contactor also controls the frequency of the oscillator in unit 56. The unit 56 comprises conventional circuits which perform the functions of an oscillator and amplifier and are not shown in detail since these are well known. The oscillator may comprise a gas tube relaxation oscillator or a multivibrator. Oscillators of this type may be made to lock in with the impulse applied through the contactor 110 by adjusting the oscillator to the approximate frequency of the contactor and applying the impulse from the contactor to the grid circuit of a gas triode tube which forms an element of the oscillator. The locked-in oscillator may be followed by a tuned amplifier comprising one or more tuned stages of amplification which will eliminate undesired harmonics.

The output of the oscillator-amplifier 56 may be split into two phases approximately 90° apart by means of a phase splitter 119. Any of the known types of phase shifting networks may be used for this purpose. One simple and well known way of accomplishing such a phase shift is to use a capacity of suitable value in series with the winding of one servomotor 48. If it is desired to shift the phase of both motors simultaneously, this may be done by altering the tuning of the amplifier in unit 56 by adjusting the capacity or inductance in one or more of its tuned stages. The two quadrature outputs of the phase shifter 119 are fed by circuits 57 and 58 to the respective orienting servomotors 47 and 48. Thus, the quadrature voltages in circuits 57 and 58 bear a fixed phase relation to the sequential excitation of the vanes 301-a, b, c and d.

The orienting servomotors 47 and 48 are conveniently of the two-phase A.-C. type. One phase of each motor is energized continuously by A.-C. which is obtained by means of the contactor 110, modulation-frequency oscillator 56 and phase shifter 119 and which is in synchronism with the sequence of excitation of vanes 301. If necessary this power may be amplified up to a suitable level of a few watts and adjusted to the proper phase. This power is supplied to the two motors 47 and 48 by voltages whose phases differ by 90°, that is the voltage in circuit 57 supplying one phase of motor 47 is 90° out of phase from that in circuit 58 supplying one phase of motor 48. The other phase of each motor is energized in proportion to the output modulation of element 300 and is supplied through circuit 65 as previously explained. The signal in circuit 65 also follows the phase of the output modulation of element 300. Now if a modulation is present in the magnetometer-output signal and the two windings of either motor are excited in exactly the same phase, the motor will not run. This condition should obtain when the alignment error, i. e. misalignment between the axis of element 301 and the direction of the ambient total magnetic vector, is at right angles to the gimbal action of the motor in question. It may always be made so by inserting the proper amount of phase shift in a suitable place in the circuit by conventional phase-shifting means. Under the same conditions, the other motor will be arranged to receive voltages differing 90° in phase so that it will run in the correct sense with an output limited only by the amount of modulation. An error of quite a few degrees in the servomotor supply phase adjustments has been found not to be serious, as then the magnetometer orientation is restored along a curved or spiral path which is not seriously longer than the ideal straight radial path. By way of example, a suitable orienting motor which may be used is the Kollsman 60 cycle, model 776-02. Its 60 C. P. S. frequency represents a reasonable rotational speed for the nutation and the motor is capable of quickly stopping or reversing and requires only about 5 watts per phase. The 60 C. P. S. frequency is also a convenient operating frequency for generator 305, generator 304 being of a much higher frequency, for example 30,000 C. P. S. as suggested above.

In the operation of the apparatus, if the average axis of the sensitive element 300 is in the direction of the total magnetic vector, its output signal will have no modulation. This is because the angle which the axis of instantaneous sensitivity makes with the magnetic vector is always the same at each point of the former's nutation. Therefore, the output signal from element 300 will be a steady unmodulated A.-C. whose value after amplification and demodulation (rectification) will be recorded by recorder 62. Since there will be no signal in lead 65, the servomotors will not be actuated. Any misplacement of the average axis of the magnetometer element with the direction of total magnetic vector will cause a variation in the field undergone by element 300 during the cycle of nutation, resulting in modulation of the output from the element 300, which in turn gives rise to a signal in lead 65. The phase of this signal in lead 65 will determine which of the motors 47 and 48 will be caused to rotate and thus bring the magnetometer back to the normal unmodulated position.

The amplified signal representing the average output of the detector element 300 is recorded by recorder 62 which may be of the self-balancing potentiometric type. In order to increase the precision of the reading on recorder 62 the greater part of the field being measured by element 300 may be balanced out by a D.-C. current supplied to the output circuit of the magnetometer element 300 as described in copending application Serial No. 756,426 previously mentioned. The D.-C. buck-out circuit does not affect the A.-C. operation of the magnetometer as described above. When the ambient magnetic field is nearly balanced out in this manner, recorder 62 will indicate variations in the remaining portion experienced by element 300 and the precision obtainable on recorder 62 may therefore be made very high.

What I claim as my invention is:

1. A self-orienting magnetometer comprising a magnetic field responsive element producing an electrical signal in proportion to the intensity of magnetic field along its principal axis of sensitivity, support means on which said element is rigidly mounted, a configuration of ferromagnetic material symmetrically placed around the axis of said element and rigidly mounted on said support, means for saturating respective parts of said material in progressive sequence around the axis of said element whereby the field affecting said element and the output of said element is modulated in synchronism with said progression when the principal axis of sensitivity of said element is not coincident with the direction of the ambient-magnetic field, a universal mounting for said support, orienting servo means mechanically connected respectively to the axes of said universal mounting, and means electrically connected to said element responsive to quadrature components of modulation in the output of said element controlling respectively said servo means in a manner to restore the principal axis of sensitivity of said element to coincidence with the direction of the ambient-magnetic field.

2. A self-orienting magnetometer comprising a magnetic field responsive element producing an electrical signal in proportion to the intensity of magnetic field along its principal axis of sensitivity, support means on which said element is rigidly mounted, a plurality of ferromagnetic vanes symmetrically placed around the axis of and near one end of said element and rigidly mounted on said support, means for saturating each of said vanes in progressive sequence around the axis of said element whereby the field affecting said element and the output of said element is modulated in synchronism with said progression when the principal axis of sensitivity of said element is not coincident with the direction of the ambient-magnetic field, a universal mounting for said support, orienting servo means mechanically connected respectively to the axes of said universal mounting, and means electrically connected to said element responsive to quadrature components of modulation in the output of said element controlling respectively said servo means in a manner to restore the principal axis of sensitivity of said element to coincidence with the direction of the ambient-magnetic field.

3. A self-orienting magnetometer comprising a magnetic field responsive element producing an electrical signal in proportion to the intensity of magnetic field along its principal axis of sensitivity, support means on which said element is rigidly mounted, a plurality of ferromagnetic vanes symmetrically placed around the axis of and near one end of said element and rigidly mounted on said support, means for applying a saturating alternating field to each of said vanes in progressive sequence around the axis of said element whereby the field affecting said element and the output of said element is modulated in synchronism with said progression when the principal axis of sensitivity of said element is not coincident with the direction of the ambient-magnetic field, a universal mounting for said support, orienting servo means mechanically connected respectively to the axes of said universal mounting, and means electrically connected to said element responsive to quadrature components of modulation in the output of said element controlling respectively said servo means in a manner to restore the principal axis of sensitivity of said element to coincidence with the direction of the ambient-magnetic field.

4. A self-orienting magnetometer comprising a magnetic field responsive element producing an electrical signal in proportion to the intensity of magnetic field along its principal axis of sensitivity, support means on which said element is rigidly mounted, a plurality of ferromagnetic vanes symmetrically placed around the axis of and near one end of said element and rigidly mounted on said support, electrical windings on each of said vanes, means for exciting with an alternating current each of said windings in progressive sequence around the axis of said element, said alternating-current excitation being of sufficient peak amplitude to saturate each respective vane whereby the field affecting said element and the output of said element is modulated in synchronism with said progression when the principal axis of sensitivity of said element is not coincident with the direction of the ambient-magnetic field, means for obtaining quadrature electrical signals which are related in phase to said sequence of excitation, a universal mounting for said support, orienting servo means mechanically connected respectively to the axis of said universal mounting, and means electrically connected to said element responsive to quadrature components of modulation in the output of said element controlling respectively said servo means in a manner to restore the principal axis of sensitivity of said element to coincidence with the direction of the ambient-magnetic field.

5. A method of periodically deflecting the axis of sensitivity of a magnetically-sensitive element which comprises placing adjacent to the element a configuration of ferromagnetic material which is radially symmetrical with respect to the principal axis of sensitivity thereof and periodically saturating respective parts of said material asymmetrically with respect to a plane perpendicularly bisecting said element and in progressive sequence around said axis.

6. A method of periodically deflecting the axis of sensitivity of a magnetically-sensitive element which comprises placing adjacent to the element a configuration of ferromagnetic material which is radially symmetrical with respect to the principal axis of sensitivity thereof and periodically saturating respective parts of said material asymmetrically with respect to a plane perpendicularly bisecting said element and in progressive sequence around said axis by applying to said parts in said sequence an alternating field of frequency substantially higher than the frequency of said sequence.

GARY MUFFLY.

REFERENCES CITED

The following references are of record in the file of this patent:

UNITED STATES PATENTS

| Number | Name | Date |
|---|---|---|
| 2,468,554 | Hull | Apr. 26, 1949 |